United States Patent [19]
Wurz et al.

[11] Patent Number: 5,726,514
[45] Date of Patent: Mar. 10, 1998

[54] CIRCUIT ARRANGEMENT FOR ENERGIZING A TWO-PHASE ELECTRIC MACHINE

[75] Inventors: Johann Wurz, Deutsch Wagram; Rudolf Fehringer, Vienna, both of Austria

[73] Assignee: Voith Turbo GmbH & Co. KG, Heidenheim, Germany

[21] Appl. No.: 754,625

[22] Filed: Nov. 21, 1996

[30] Foreign Application Priority Data

Nov. 28, 1995 [DE] Germany ............... 195 44 307.1
Nov. 28, 1995 [DE] Germany ............... 195 44 309.8

[51] Int. Cl.$^6$ .............................. H02K 21/02; H02K 3/28
[52] U.S. Cl. ............................. 310/179; 310/184; 310/11 R; 310/162
[58] Field of Search ................................. 310/112, 179, 310/184, 198, 162

[56] References Cited

U.S. PATENT DOCUMENTS

| | | | |
|---|---|---|---|
| 3,629,636 | 12/1971 | Hill | 310/184 |
| 5,063,319 | 11/1991 | Mason et al. | 310/210 |
| 5,502,359 | 3/1996 | Schemmann et al. | 310/40 MM |

FOREIGN PATENT DOCUMENTS

| | | | |
|---|---|---|---|
| 0 237 778 A2 | 9/1987 | European Pat. Off. | H02K 41/03 |
| 0 352 189 A1 | 1/1990 | European Pat. Off. | H02K 41/03 |
| 0 499 470 A2 | 8/1992 | European Pat. Off. | H02P 7/622 |
| 0 677 914 A1 | 10/1995 | European Pat. Off. | |
| 2 452 816 | 3/1980 | France | H02K 19/06 |
| 1167965 | 10/1964 | Germany . | |
| 35 36 538 A1 | 8/1987 | Germany | H02K 1/06 |
| 37 05 089 A1 | 8/1988 | Germany | H02K 21/00 |
| 37 05 089 C2 | 8/1988 | Germany | H02K 21/00 |
| 40 17 442 A1 | 12/1991 | Germany | H02P 7/44 |
| 42 32 134 A1 | 3/1994 | Germany | H02P 7/63 |

*Primary Examiner*—Steven L. Stephan
*Assistant Examiner*—Judson H. Jones
*Attorney, Agent, or Firm*—Randall J. Knuth

[57] ABSTRACT

The invention concerns a transverse-flux machine whose stator features a winding with a first phase and a second phase. The windings of the first phase and the windings of the second phase are divided in two component windings each. The first component winding of the first phase is wired in series with the second component winding of the second phase, while the second component winding of the first phase is wired in series with the first component winding of the second phase.

16 Claims, 1 Drawing Sheet

CIRCUIT ARRANGEMENT FOR ENERGIZING A TWO-PHASE ELECTRIC MACHINE

BACKGROUND OF THE INVENTION

The invention concerns a circuit arrangement for energizing an electric machine, and in particular a transverse-flux machine including a stator having a winding with a first and second phase.

Transverse-flux machines (TFM), such as known, for example, from DE 35 36 538, are specific electric machines that represent, in their basic form, single-phase energy converters. The major components of such a transverse flux machine are a stationary stator and a rotor arranged therein in rotatable fashion.

The electric energy necessary for a desired operating point of a transverse-flux machine can be conditioned in various ways, for example, in an inverter, to the effect that a voltage of variable amplitude, frequency and phase position is applied across the machine terminals.

The transverse-flux machine generates then a torque which, in first approximation, oscillates sinusoidally between a maximum value and zero, periodically with the electric angle of rotation.

Machines with such behavior can neither start by themselves nor are they suited for use as drive units. According to DE 37 05 089, two transverse-flux basic machines can be coupled mechanically, thus combining into a two-phase electric machine. These machines are controlled such that with both component machines interacting, a mechanical torque is produced that is independent of the phase position of the rotor.

Such a motor composed of two identical component machines (electric phases) represents, for a plurality of applications, an economic optimum in terms of space, weight and costs. For example, using a two-phase transverse-flux machine as electric single-wheel drive for city buses of the future is a contemplated option as related in "Elektrischer Einzelradantrieb für Citybusse der Zukunft" [Electric Single-wheel Drives for City Buses of the Future] in: Der Nahverkehr 6-1994, Alba Fachverlag, Düsseldorf.

The inverter power output stage necessary for supplying energy to one of the two motor phases, such as known from DE 37 05 089, is structured such that two switchable half-bridge rectifiers are arranged between the potential rails of a constant-voltage intermediate circuit, with the motor windings connected to the alternating-voltage terminals of the half-bridge rectifier.

A disadvantage on this power supply to a two-phase transverse-flux machine is that it always requires four half-bridge inverters. A further drawback is the need for using special cables.

SUMMARY OF THE INVENTION

The objective of the invention is to provide a two-phase transverse-flux machine that can be energized via three half-bridge inverters, as well as a circuit arrangement for energizing a two-phase electric machine.

This objective is meet according to the invention by the transverse-flux machine including a stator having a winding with a first phase and a second phase, the machine including that the windings of the first phase ($N_a$) and the windings of the second phase ($N_b$) are each subdivided into first and second component windings. The first component winding of the first phase is wired in series with the second component winding of the second phase while the second component winding of the first phase is wired in series with the first component winding of the second phase.

The invention also includes a circuit for energizing a two-phase electric machine having windings. The circuit includes a two-phase electric machine connected to a three phase converter power output stage, whose phase windings (of the electric machine) each connect with one terminal to a phase terminal and with their other terminal, jointly, to the third phase terminal of the three phase converter power output stage. Each winding of the two phases of the electric machine is divided into two component windings, the first component winding of the first phase wired in series with the second component winding of the second phase of the electric machine, while the second component winding of the first phase is wired in series with the first component winding of the second phase of the electric machine.

The three phase energization of a transverse-flux machine not only overcomes the above disadvantages of the prior art, but has additionally further advantages. For example, owing to the three phase energization, a specific power can be sent through three branches, instead of four. This makes for a better utilization of the inverter valves and enables a more compact design.

Moreover, as compared to the energization of a transverse-flux machine as employed heretofore, a three phase energization with an identical terminal voltage favorably allows the utilization of a larger range of rotational speeds.

DRAWING

The invention is described hereafter with the aid of exemplary embodiments, without restricting its general application, the drawing showing in:

FIG. 1 shows a basic wiring diagram of a transverse flux machine 1. Transverse flux machines comprise, as major assemblies, a stator as well as a rotor, the two forming a machine phase as shown in German Patent DE 35 36 538 or DE 37 05 089.

The description, transverse-flux machine, derives from the specific pattern of the magnetic flux. In conventional machines with a longitudinal magnetic circuit, the magnetic flux proceeds from the air gap via the stator tooth and the yoke to the adjacent pole in a peripheral direction, i.e., the flux proceeds between two poles in a peripheral direction, in the direction of rotor rotation. In the transverse arrangement, in contrast, the magnetic flux is rotated 90° and proceeds in a plane transverse to the direction of movement to the axially pertaining pole. The rotor consists of one or several rings of permanent magnets, which alternately are magnetized in peripheral direction, with interposed soft-iron elements. The stator assembly of one phase supports U-shaped soft-iron laminations with a ring winding disposed in their recess. The simplified substitute wiring diagram of such a phase consists of an alternating voltage source with impressed sinusoidal voltage and major inductance.

Multiple-phase machines, such as known from German Patent Documents DE 35 36 538 and DE 37 05 089, are obtained in an easy manner by mechanical combination of the single-phase modules described briefly above.

Figure 1:
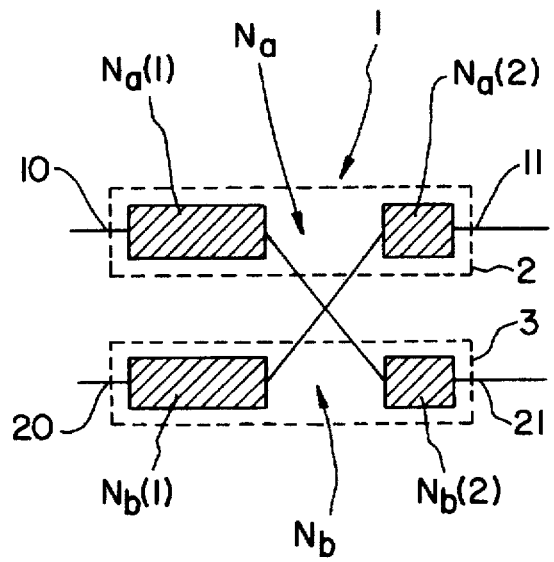
FIG. 1 is a diagram of a two-phase transverse-flux machine with a winding arrangement for three phase energization.

Two-phase transverse-flux machines such as illustrated in the basic wiring diagram relative to FIG. 1 have proved to be particularly favorable for various fields of application.

These machines are composed of two phases arranged side by side mechanically, a first phase $N_a$ and a second phase $N_b$. The winding of the stator assembly of each phase $N_a$, $N_b$, in the present case, is split in two component windings, a first component winding $N_a(1)$ of the first phase $N_a$ and a second component winding $N_a(2)$ of the first phase $N_a$ as well as a first component winding $N_b(1)$ of the second phase $N_b$ and a second component winding $N_b(2)$ of the second phase $N_b$. As can be seen from the drawing (FIG. 1), the two-phase transverse-flux machine may preferably feature four external terminals 10, 11, 20, 21. In the inventional two-phase transverse-flux machine, the first component winding of the first phase is wired in series with the second component winding of the second phase, while the first component winding of the second phase is wired in series with the second component winding of the first phase. Especially preferred is splitting the winding of the two phases in component windings in a manner such that the four external terminals 10, 11, 20, 21 can be connected to a three phase converter, thereby transforming a symmetric three phase system to a two-phase system.

A three phase energization of the inventional transverse-flux machine is possible, e.g., when the external terminals 10 and 20 are hooked to a common potential. In a degraded alternative embodiment, also the external terminals 11 and 21 may be hooked to a common potential.

The following number of turns of the component windings, depending on the total number of turns, has been shown to be particularly preferred for the case of a three phase energization of the inventional two-phase transverse-flux machine:

For the first component winding of the phases:

$$W_a(1) = W_a \cos(15°)$$

$$W_b(1) = W_b \cos(15°)$$

and for the second component winding of the phases:

$$W_a(2) = W_a \sin(15°)$$

$$W_b(2) = W_b \sin(15°).$$

$W_a$, $W_b$ is the total number of turns that is needed for the desired flux, and $W_a(1)$, $W_a(2)$, $W_b(1)$, $W_b(2)$ are the numbers of turns of the component windings.

Particularly preferred is a symmetric configuration of the transverse-flux machine where the total numbers of turns of both phases of the machine are identical, as a result of which also the turn numbers of the component windings of the two phases are equal. Such a machine runs smoothly.

Figure 2:
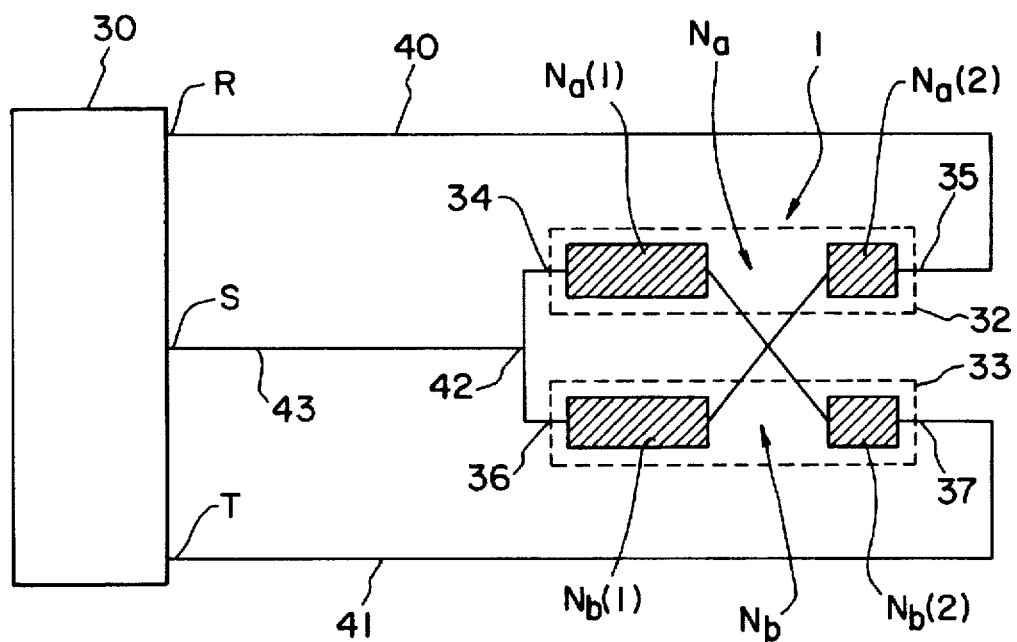
FIG. 2 is a diagram of a circuit arrangement for energizing a two-phase electric machine by means of a three phase converter power output stage.

FIG. 2 illustrates a circuit arrangement for energizing a two-phase electric machine, such as transverse-flux machine 1, by hookup to a three phase converter power output stage 30. Transverse-flux machines are electric machines with a specific magnetic flux pattern, as described above.

The converter power output stage is an inverter of conventional design such as used in energizing typical three phase AC machines. Manufactured in large numbers at low cost, such three phase inverters are well known from a plurality of documents, e.g., from the textbook "Leistungselektronik, technische Elektronik, Band 2" [Power Electronics, Technical Electronics, Vol. 2] by Prof. Dr.-Ing. Klaus Bystron, Karl Hahset-Verlag, Munich, Vienna, 1979.

The two-phase transverse-flux machine according to FIG. 1, as illustrated in FIG. 2, comprises a first phase 32 and a second phase 33 as well as four external terminals 34, 35, 36, 37. These terminals of the transverse-flux machine 1 are hooked to the three terminals R, S, T, of the standard converter power output stage as follows:

Terminal 35 of the first phase is connected to terminal R of the converter byway of line 40. Terminal 37 of the second phase connects via line 41 to terminal T of converter 30. Terminals 34 and 36 of the first and second phases are at point 42 connected together to a common potential, and connect by way of line 43 to terminal S of three phase converter 30.

One preferred embodiment is where terminals 34 and 36 are not designed as external terminals of the transverse-flux machine, but as fixed wiring of the terminals 34 and 36 to a common external terminal 42.

Also possible in an embodiment, somewhat degraded as against the one illustrated before, is the connecting of the terminals 35 and 36 of the transversal-flux machine to a common potential and to the terminal S of the three phase converter. In this case, however, terminal 34 must be connected to terminal R, while terminal 36 requires connection to terminal T, of the three phase converter.

A particular advantage of energizing a two-phase winding system with a three phase standard converter power output stage is also constituted by the fact that standard three phase cables with amply insulation of individual wires can be used.

The two-phase transverse-flux machine 1 itself features with three phase energization a configuration such that each winding of a phase $N_a$, $N_b$ is split in two component windings $N_a(1)$, $N_a(2)$ as well as $N_b(1)$ and $N_b(2)$. In accordance with the invention, the wiring of the component windings of the different phases of the two-phase transverse-flu machine, when connected to a three phase power converter, is as follows:

The first component winding $N_a(1)$ of the first phase $N_a$ is wired in series with the second component winding $N_b(2)$ of the second phase $N_b$, whereas the first component winding $N_b(1)$ of the second phase $N_b$ is wired in series with the second component winding $N_a(2)$ of the first phase $N_a$.

Under the constraints of a maximally constant torque pattern over time, in a two-phase transverse-flux machine requiring a shifting of the flux by 90°, of the individual phases relative to each other, (refer also to "Elektrischer Einzelradantrieb für Citybusse der Zukunft" [Electric Single-Wheel Drive for City Buses of the Future; loc.cit.] and for the case of a symmetric three phase system with identical phase currents (refer also to Dubbel, Taschenbuch für den Maschinenbau [Mechanical Engineering Handbook], pages V8–V9, Springer-Verlag, Berlin 1995), it has been demonstrated that with a specified total number of turns for achieving a desired flux the following component turn numbers lead to an optimum operating performance:

Number of turns, first component winding of the first phase: $W_a(1) = W_a \cos(15°)$ Number of turns, second component winding of the first phase: $W_a(2) = W_a \sin(15°)$ Number of turns, first component winding of the second phase: $W_b(1) = W_b \cos(15°)$ Number of turns, second component winding of the second phase: $W_b(2) = W_b \sin(15°)$ The total number of turns of the first and second phases are preferably identical, hence $W_a = W_b$.

Thus, the present invention presents for the first time a circuit arrangement for a two-phase transverse-flux machine that is energized by a three phase converter.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A transverse-flux machine including a stator having a winding with a first phase and a second phase, said machine comprising:

the winding of the first phase and the winding of the second phase are each subdivided into first and second component windings; and said first component winding of the first phase is wired in series with said second component winding of the second phase while said second component winding of the first phase is wired in series with said first component winding of the second phase.

2. The transverse-flux machine of claim 1 in which said two component windings of one phase differ in number of turns.

3. The transverse-flux machine of claim 1 in which the number of turns of said first component winding of the first phase and the number of turns of said first component winding of the second phase and that the number of turns of said second component winding of the first phase, and the number of turns of said second component winding of the second phase are identical.

4. The transverse-flux machine of claim 1 in which the number of turns of said first component winding of one of the phases represents the total number of turns of that phase multiplied by cos (15°), while the number of turns of said second component winding of said one of the phases is the total number of turns of that phase multiplied by sin (15°).

5. A circuit for energizing a two-phase electric machine, having windings, said circuit comprising:

a two-phase electric machine having phase windings with terminals connected to a three phase converter power output stage having three phase terminals, said phase windings each connect with one terminal to a phase terminal and with their other terminal, jointly, to the third phase terminal of a three phase converter power output stage, each winding of the two phases of said electric machine is divided into two component windings, the first component winding of said first phase wired in series with the second component winding of said second phase of said electric machine, while the second component winding of said first phase is wired in series with the first component winding of said second phase of the electric machine.

6. The circuit of claim 5 in which the number of turns of said first component winding of said first phase and said first component winding of said second phase of the electric machine, and the number of turns of second component winding of said first phase and of said second component winding of said second phase of said electric machine are identical.

7. A circuit of claim 5 in which for each phase, the number of turns of said first component winding of said electric machine is the total number of turns of the respective phase of said electric machine multiplied by cos (15°), and the number of turns of the second component winding of said electric machine is the total number of windings of the respective phase of the electric machine multiplied by sin (15°).

8. The circuit of claim 7 in which the total number of turns of said first phase equals the total number of turns of said second phase.

9. The circuit of claim 5 in which said two-phase electric machine is a transverse-flux machine.

10. The circuit of claim 9 in which said transverse-flux machine is a transverse-flux motor.

11. The circuit of claim 9 in which said transverse-flux machine is a transverse-flux generator.

12. The transverse-flux machine of claim 2 in which the number of turns of said first component winding of the first phase and the number of turns of said first component winding of the second phase and that the number of turns of said second component winding of the first phase, and the number of turns of said second component winding of the second phase are identical.

13. The transverse-flux machine of claim 2 in which the number of turns of said first component winding of one of the phases represents the total number of turns of that phase multiplied by cos (15°), while the number of turns of said second component winding of said one of the phases is the total number of turns of that phase multiplied by sin (15°).

14. The transverse-flux machine of claim 3 in which the number of turns of said first component winding of one of the phases represents the total number of turns of that phase multiplied by cos (15°), while the number of turns of said second component winding of said one of the phases is the total number of turns of that phase multiplied by sin (15°).

15. A circuit of claim 6 in which for each phase, the number of turns of said first component winding of said electric machine is the total number of turns of the respective phase of said electric machine multiplied by cos (15°), and the number of turns of the second component winding of said electric machine is the total number of windings of the respective phase of the electric machine multiplied by sin (15°).

16. A transverse-flux machine whose stator features a winding with a first phase ($N_a$) and a second phase ($N_b$), characterized in that the winding of the first phase ($N_a$) and the winding of the second phase ($N_b$) are subdivided each in two component windings ($N_a(1)$, $N_a(2)$; $N_b(1)$, $N_b(2)$), and in that the first component winding of the first phase ($N_a(1)$) is wired in series with the second component winding of the second phase ($N_b(2)$), while the second component winding, of the first phase ($N_a(2)$), is wired in series with the first component winding of the second phase ($N_b(1)$).

* * * * *